US008073429B2

(12) United States Patent
Karaoguz et al.

(10) Patent No.: US 8,073,429 B2
(45) Date of Patent: Dec. 6, 2011

(54) CELLULAR MEDIA MESSAGE FORWARDING

(75) Inventors: Jeyhan Karaoguz, Irvine, CA (US); James D. Bennett, Karlovy Vary (CZ)

(73) Assignee: Broadcom Corporation

(*) Notice: Subject to any disclaimer, the term of this patent is extended or adjusted under 35 U.S.C. 154(b) by 305 days.

(21) Appl. No.: 11/217,907

(22) Filed: Sep. 1, 2005

(65) Prior Publication Data

US 2006/0094407 A1 May 4, 2006

Related U.S. Application Data

(60) Provisional application No. 60/623,955, filed on Nov. 1, 2004.

(51) Int. Cl.
*H04M 1/725* (2006.01)
(52) U.S. Cl. ............. 455/412.1; 455/412.2; 455/413; 379/88.04; 379/88.11; 379/88.12; 379/88.13; 379/88.18; 379/88.22; 379/88.23; 379/88.25; 370/395.1; 370/471; 370/473; 370/312
(58) Field of Classification Search .......... 455/412.1, 455/413, 412.2, 466; 379/1.02, 88.04, 88.11, 379/88.12, 88.13, 88.18, 88.22, 88.23, 88.25, 379/51, 41; 370/395.1, 471, 4, 473, 312
See application file for complete search history.

(56) References Cited

U.S. PATENT DOCUMENTS

| | | | |
|---|---|---|---|
| 7,099,452 B1 * | 8/2006 | Infosino | 379/215.01 |
| 2001/0041590 A1 | 11/2001 | Silberfenig et al. | |
| 2004/0005877 A1 * | 1/2004 | Vaananen | 455/412.1 |
| 2004/0247097 A1 * | 12/2004 | Dillard et al. | 379/88.22 |
| 2005/0059381 A1 | 3/2005 | Hintermeister et al. | |

FOREIGN PATENT DOCUMENTS

| | | |
|---|---|---|
| CN | 1326627 | 12/2001 |
| EP | 0757469 A | 2/1997 |
| EP | 0926870 A | 6/1999 |
| GB | 2317784 A | 4/1998 |
| WO | WO 98/35485 * | 2/1998 |
| WO | WO 98/35485 * | 8/1998 |
| WO | WO-98/35485 A | 8/1998 |
| WO | WO-2004/025934 A | 3/2004 |

* cited by examiner

*Primary Examiner* — Nick Corsaro
*Assistant Examiner* — Amanuel Lebassi
(74) *Attorney, Agent, or Firm* — McAndrews, Held & Malloy, Ltd.

(57) ABSTRACT

A system and method for communicating a message. Various aspects of the present invention may comprise determining whether a communication link between a sender's communication device and a recipient's communication device is presently available. If it is determined that a communication link between the sender's communication device and the recipient's communication device is not presently available, then the sender may be provided with an option to record a message on the sender's communication device for later automatic delivery to the recipient's communication device. A message from the sender may then be recorded on the sender's communication device for later automatic delivery to the recipient's communication device, and the recorded message may be automatically delivered to the recipient's communication device. Communicating the recorded message to the recipient's communication device may, for example, comprise persistently attempting to deliver the recorded message from the sender's communication device to the recipient's communication device.

30 Claims, 6 Drawing Sheets

US 8,073,429 B2

CELLULAR MEDIA MESSAGE FORWARDING

CROSS-REFERENCE TO RELATED APPLICATIONS/INCORPORATION BY REFERENCE

This patent application is related to and claims priority from provisional patent application Ser. No. 60/623,955, filed Nov. 1, 2004, and titled "CELLULAR MEDIA MESSAGE FORWARDING," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various communication systems (e.g., cellular communication systems) do not provide reliable communication links. Communication links, particularly radio communication links, may be adversely affected by a large variety of interfering factors. As an example, consider a cellular communication environment where a user may effectively be in-and-out of the communication network many times during a day, depending on weather, system demands, transportation means, transportation route, signal strength, building architecture, etc. Such dead time or dead-zones interfere with timely communication between parties. In an exemplary communication scenario, a user attempting to communicate a message to a recipient may have to attempt to communicate the message a multitude of times and may miss windows of opportunity to accomplish the desired communication while performing other tasks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for communicating a cellular message to a recipient, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
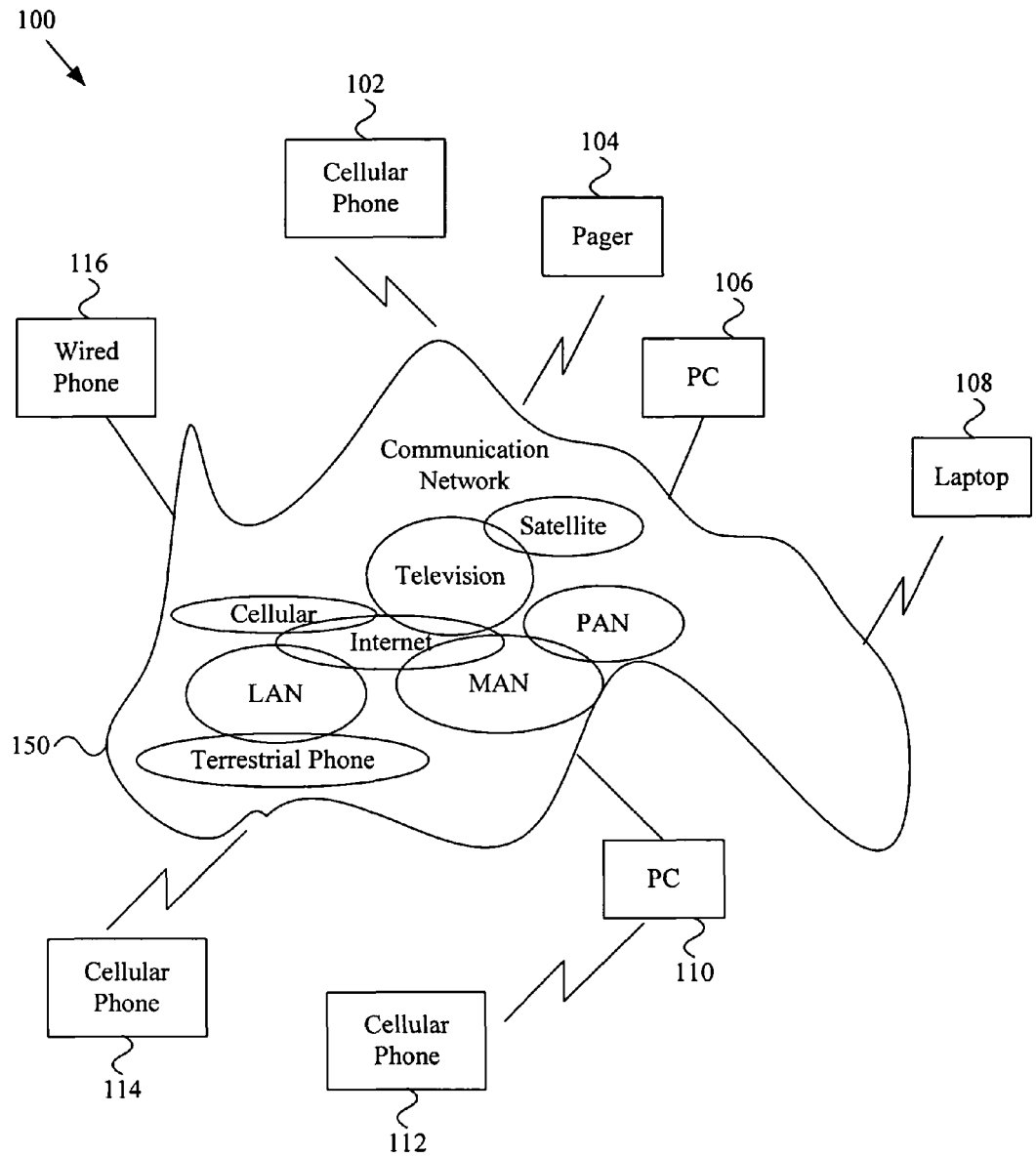
FIG. 1 is a diagram illustrating an exemplary communication environment.

FIG. 1 is a diagram illustrating an exemplary communication environment 100. An exemplary communication scenario may utilize any of a large variety of communication devices that may, at times, be communicatively coupled over one or more communication networks. For example, the exemplary communication environment 100 may comprise many communication networks, which in turn, may be communicatively coupled to each other in any of a large number of configurations.

For example, the exemplary communication environment 100 may comprise a communication network 150 that couples various communicating entities. The exemplary communication network 150 may, for example and without limitation, comprise one or more cellular communication networks, television networks, satellite networks, terrestrial telephone networks and various computer networks (e.g., the Internet, one or more local area networks (LANs), metropolitan area networks (MANs), personal area networks (PANs), wide area networks (WANs), etc.). Such communications networks may be independent or may, in various scenarios, be communicatively coupled to form a composite communication network, such as shown in FIG. 1.

In a first non-limiting exemplary scenario, the first cellular telephone 102 may be communicatively coupled to the second cellular telephone 114 through one or more cellular telephone networks. Also for example, the first cellular telephone 102 may be communicatively coupled to the second cellular telephone 114 through a cellular telephone network, which in turn is communicatively coupled to the Internet, which in turn is communicatively coupled to a LAN, which in turn is communicatively coupled to the second cellular telephone 114.

In a second non-limiting exemplary scenario, the first cellular telephone 102 may be communicatively coupled to the third cellular telephone 112 through a cellular telephone network, which in turn is communicatively coupled to a television communication network, which in turn is communicatively coupled to a MAN, which in turn is communicatively coupled to a PC, which in turn is communicatively coupled to the third cellular telephone 112.

In a third non-limiting exemplary scenario, the first laptop 108 may be communicatively coupled to the wired phone 116 through a PAN, which in turn is communicatively coupled to the Internet, which in turn is communicatively coupled to a terrestrial telephone network, which in turn is communicatively coupled to the wired phone 116.

In general, various communication devices, non-exclusive examples of which are shown in FIG. 1, may be communicatively coupled through a communication network 150, which may comprise any of a large variety of communication network components in any of a large variety of configurations. Accordingly, the scope of various aspects of the present invention should not be limited by characteristics of any particular communication devices or by any particular communication network configuration that may communicatively coupled such communication devices.

Figure 2:
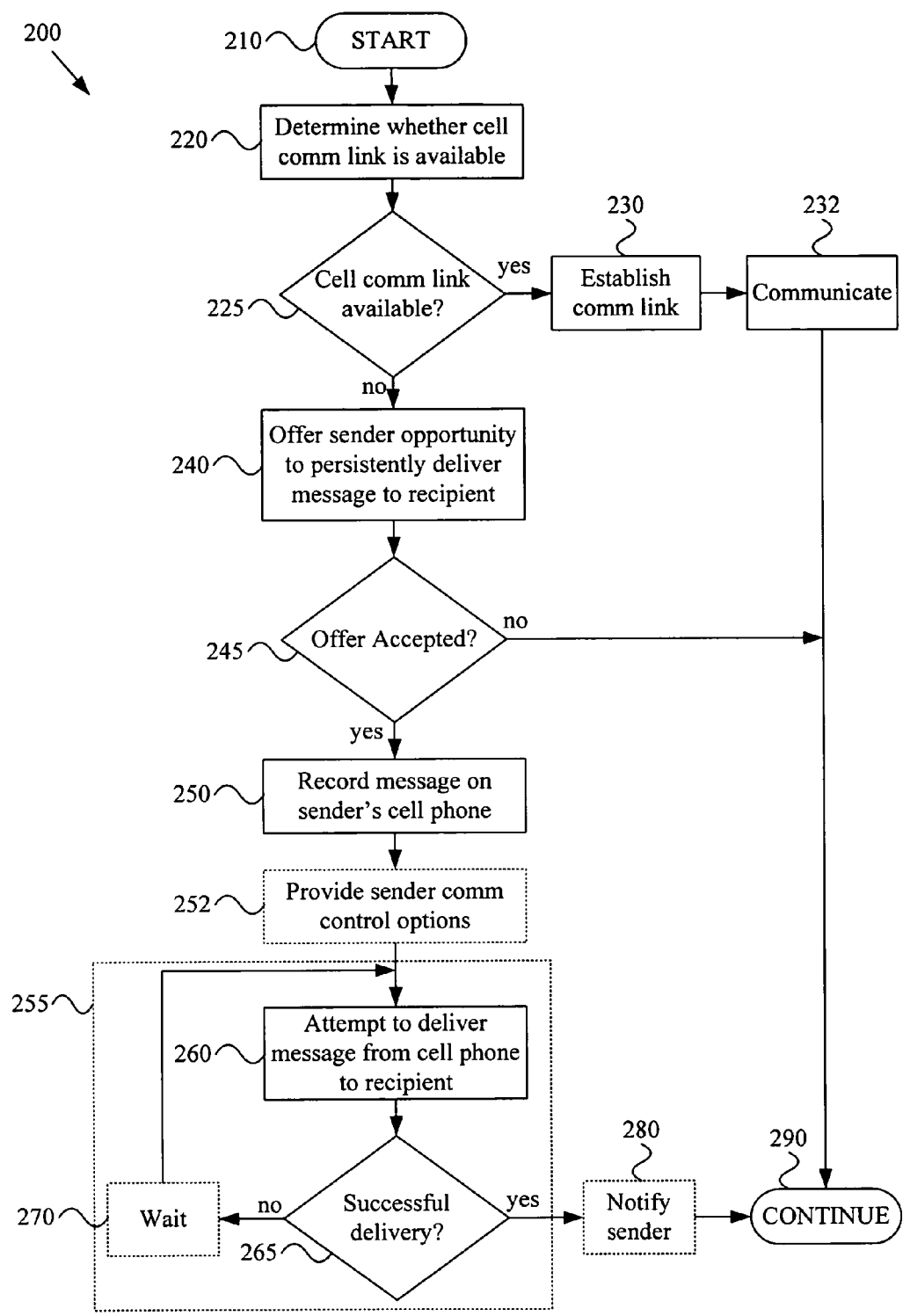
FIG. 2 is a flow diagram illustrating an exemplary method for communicating a cellular message to a recipient.

FIG. 2 is a flow diagram illustrating an exemplary method 200 for communicating a cellular message to a recipient. Though the exemplary method 200 is explained in the context of a cellular communication scenario (e.g., from the perspective of a sender's cellular telephone), various aspects of the present invention are readily extensible to other types of communication and communication devices. Accordingly, the scope of various aspects of the present invention should not be limited by characteristics of the exemplary cellular communication scenario.

The exemplary method 200 may begin executing at step 210. The method 200 may begin executing for any of a large variety of reasons. For example and without limitation, the method 200 may begin executing upon initiation of a cellular telephone call (or other type of communication attempt) by the sender. Also for example, the method 200 may begin executing upon the sender explicitly requesting the method 200 to begin executing. Accordingly, the scope of various aspects of the present invention should not be limited by characteristics of any particular initiating cause or condition.

The exemplary method 200 may, at step 220, comprise determining whether a communication link between the cellular telephone and a communication device of the recipient is presently available (or may presently be established).

The communication device of the recipient may comprise characteristics of any of a variety of communication devices. For example and without limitation, the communication device of the recipient may comprise characteristics of a cellular telephone. Also for example, the communication device of the recipient may comprise characteristics of a pager, computer (e.g., pocket computer, notebook computer, laptop computer, desktop computer, etc.), personal email device, etc. Further for example, the communication device of the recipient may comprise characteristics of a portable or non-portable communication device. Additionally for example, the communication device of the recipient may comprise characteristics of a hard-wired communication device, RF communication device, optical communication device, etc. The scope of various aspects of the present invention should not be limited by characteristics of any particular type of communication device.

Step 220 may comprise determining whether a communication link may be established between the cellular telephone and the communication device of the recipient in any of a variety of manners. For example and without limitation, step 220 may comprise the cellular telephone attempting to establish an end-to-end communication link between the cellular telephone and the communication device of the recipient. Also for example, step 220 may comprise communicating with a database (or a plurality of databases) that comprises information of whether the communication device of the recipient is presently active and/or communicatively coupled to an active and available communication network. In a non-limiting exemplary scenario, step 220 may comprise determining whether the communication device of the recipient is currently registered as active with a cellular network. In another non-limiting exemplary scenario, step 220 may comprise determining whether the communication device of the recipient is currently registered as active with a computer network (e.g., the Internet, a company LAN, etc.). The scope of various aspects of the present invention should not be limited by characteristics of any particular manner of determining whether a communication link may be established between the cellular telephone and the communication device of the recipient.

Step 220 may, for example, comprise determining whether a communication link may be established between the cellular telephone and the communication device of the recipient over any of a variety of communication pathways that may potentially exist between the cellular telephone and the communication device of the recipient. For example and without limitation, as may be seen in FIG. 1, many potential communication pathways may exist between communication devices. Step 220 may comprise determining whether a communication link may be established over any of such potential pathways.

In a non-limiting exemplary scenario, step 220 may comprise determining whether a communication link may be established between the cellular telephone and the communication device of the recipient over a typical cellular telephone communication link. Step 220 may further, for example, comprise determining whether a communication link may be established between the cellular telephone and the communication device of the recipient over a computer communication network (e.g., the Internet, a LAN, WAN, PAN, MAN, or any combination thereof). Step 220 may also, for example, comprise determining whether a communication link may be established between the cellular telephone and the communication device of the recipient over a terrestrial hard-wired telephone system, over a cable television network or over a satellite communication network.

In such a non-limiting exemplary scenario, step 220 may comprise traversing a list of potential communication pathways (e.g., stored in on-board memory or a database communicatively coupled to the cellular telephone) until a communication link is established or until a determination is made that a communication link may not be established. Also for example, step 220 may comprise traversing an entire list of potential communication pathways to determine over which, if any, of the potential communication pathways a communication link may be established.

In general, step 220 may comprise determining whether a communication link between the cellular telephone and a communication device of the recipient is available (or may presently be established). Accordingly, the scope of various aspects of the present invention should not be limited by characteristics of any particular manner of making such a determination.

The exemplary method 200 may, at step 225, comprise controlling execution flow of the method 200 based, at least in part, on whether a communication link between the sender's cellular telephone and the recipient's communication device is available (e.g., as determined at step 220). For example, at step 225, if it has been determined that a communication link between the sender's cellular telephone and the recipient's communication device is presently available, then execution flow of the exemplary method 200 may flow to step 230 for establishment of the communication link (e.g., if such a communication link has not already been established). If, however, it has been determined that a communication link between the sender's cellular telephone and the recipient's communication device is not presently available, then execution flow of the exemplary method 200 may flow to step 240, which will be discussed below.

The exemplary method 200 may, at step 230, comprise establishing a communication link between the sender's cellular telephone and the communication device of the recipient (e.g., if such a communication link has not already been established). As mentioned previously, the communication link may comprise characteristics of any of a large variety of communication paths, including relatively complex paths traversing multiple communication networks. For example, step 230 may comprise utilizing any one or more of a variety of communication media and/or communication protocols to establish the communication link.

The exemplary method 200 may, at step 232, comprise communicating between the sender's cellular telephone and the recipient's communication device (e.g., over the communication link established at step 230). Such communication may comprise communicating any of a variety of information types over the communication link (e.g., multi-media, audio, video, textual, graphical, pictorial information, etc.). Such communication may, for example, be one-way or two-way. Such communication may, for example, comprise communicating with devices in addition to the sender's cellular telephone and the recipient's communication device. After step 232, execution of the exemplary method 200 may flow to continued processing at step 290, non-limiting examples of which will be discussed later.

As mentioned previously, at step 225, if a communication link between the sender's cellular telephone and the recipient's communication device is presently not available, then execution of the exemplary method 200 may flow to step 240. The exemplary method 200 may, at step 240, comprise providing the sender with an option to record a message on the cellular telephone for later automatic (e.g., persistent) delivery to a communication device of the recipient (e.g., when a communication link between the sender's cellular telephone and the recipient's communication device becomes available). In a non-limiting exemplary scenario, such functionality enables the sender to immediately record the message on the sender's cellular telephone, even when the cellular telephone (or the recipient's communication device) is out of contact with the cellular network or other communication networks, where the message may be automatically delivered later (e.g., without additional human interaction from the sender).

Step 240 may comprise offering the sender the option to record a message on the cellular telephone for later delivery in any of a variety of manners. For example, step 240 may comprise utilizing audible or visible indicia to notify the sender of the option. Step 240 may, for example, utilize user interface functionality of the sender's cellular telephone to notify the sender of the offered option and interface with the sender regarding the offered option.

Note that in various alternative exemplary scenarios, the sender may initiate execution of the method 200 at step 240 (or another step) directly. For example and without limitation, the sender's cellular telephone may comprise a user interface that allows the sender to initiate the recording option directly. Accordingly, the scope of various aspects of the present invention should not be limited by characteristics of any particular manner of initiating exemplary step 240 or other exemplary steps of the method 200.

The exemplary method 200 may, at step 245, control execution flow of the method 200 based, at least in part, on whether the sender desires to record a message on the cellular telephone for later automatic delivery (e.g., as offered to the sender at step 240). For example, at step 245, if it is determined that the sender does not desire to record a message on the cellular telephone for later automatic delivery, then execution flow of the exemplary method 200 may flow to step 290 for continued processing, non-limiting examples of which will be discussed later. Otherwise, if it has been determined that the sender desires to record a message on the cellular telephone for later automatic delivery, then execution flow of the exemplary method 200 may flow to step 250, which will be discussed below.

The exemplary method 200 may, at step 250, comprise, recording a message from the sender on the cellular telephone for later automatic delivery (e.g., persistent automatic delivery) to the communication device of the recipient. Step 250 may, for example and without limitation, comprise utilizing user interface functionality provided with the cellular telephone to obtain the message from the sender, and utilizing memory on-board the cellular telephone (e.g., memory chips, modules, cards, sticks and/or discs) to store the message obtained from the sender.

The message may comprise characteristics of any of a variety of message types. For example and without limitation, the message may comprise characteristics of an audio message or a video message. Also for example, the message may comprise characteristics of pictorial, textual or graphical message information. In various exemplary scenarios, the message may comprise additional information (e.g., callback information, time information, priority or urgency information, message handling control information, etc.).

Note that in various non-limiting exemplary scenarios, step 250 may comprise allowing the sender to select between pre-recorded messages. As a non-limiting example, such a message may comprise characteristics of a generic "call me ASAP" message. In such a scenario, step 250 may comprise utilizing a user interface mechanism to obtain message selection information from the sender.

Generally, step 250 may comprise recording a message from the sender on the cellular telephone for later automatic delivery to the communication device of the recipient. Accordingly, the scope of various aspects of the present invention should not be limited by characteristics of any particular message type, mechanism for obtaining or recording a message, or the timing of such a message recording.

The exemplary method 200 may, at step 252, comprise providing to the sender the capability to specify various aspects of the manner in which the recorded message is communicated to (or handled by) the communication device of the recipient. Such aspects may comprise, without limitation, timing characteristics for attempted delivery of the recorded message to the communication device of the recipient (e.g., continually retry, retry every n minutes, retry every half hour, try at particular times, etc.). Such aspects may also, for example, comprise selecting a communication path or group of communication paths over which the message may be delivered to the communication device of the recipient (e.g., specify a list or ordered list of known potential communication paths).

In various non-limiting exemplary scenarios, step 252 may also comprise providing the sender the capability to specify how the sender desires the communication device of the recipient to handle the message once the message is delivered. For example, the sender may specify that the sender desires the communication device of the recipient to present the message to the recipient in a manner similar to an incoming telephone call. Also for example, the sender may specify that the sender desires the communication device of the recipient to present the message to the recipient in a manner similar to an incoming text message. As will be discussed later, the recipient may also be provided capability to specify how to handle incoming messages (e.g., storage in on-board or off-board voice mail storage, type of notification for message arrival, message data flow control, etc.).

In various exemplary scenarios, step 252 may comprise determining message communicating and/or handling capabilities of the recipient's communication device. Step 252 may then, for example, present such information to the sender to utilize in making communication and notification decisions. Also for example, step 252 may comprise utilizing the determined capabilities to select which communication control options are presented to the sender.

In general, step 252 may comprise providing to the sender the capability to specify various aspects of the manner in which the recorded message is communicated to (or handled by) the communication device of the recipient. Accordingly, the scope of various aspects of the present invention should not be limited by characteristics of any particular manner of communicating or handling a message or by characteristics of any particular manner of providing the sender the capability to specify various aspects of message communicating or handling.

The method 200 may, at step 255, comprise automatically delivering the recorded message from the cellular telephone to the communication device of the recipient. Exemplary steps 260, 265 and 270 form an exemplary (and non-limiting) persistent delivery loop 255, which persistently attempts to deliver the recorded message to the communication device of the recipient. The persistent delivery loop 255 is an exemplary persistent delivery loop, and the scope of various aspects of the present invention should not be limited by specific characteristics of the exemplary persistent delivery loop 255.

The method 200 may, at step 260, comprise automatically (e.g., without additional human interaction with the sender) attempting to deliver the recorded message from the cellular telephone to the communication device of the recipient. Step 260 may, for example, comprise attempting to deliver the recorded message over at least one of the communication links that step 220 determined is available for communication between the cellular telephone and the communication device of the recipient.

Step 260 may, for example, comprise automatically attempting to deliver the recorded message from the cellular telephone to the communication device of the recipient or, for example, a message server associated with the communication device of the recipient. Step 260 may also, for example, comprise automatically attempting to deliver the recorded message from the cellular telephone to a communication device of a second recipient. Further for example, step 260 may comprise automatically attempting to deliver the recorded message from the cellular telephone to a defined group of recipients and/or associated respective communication devices.

As mentioned previously, a recorded message may comprise a variety of additional information (e.g., including but not limited to sender callback information). Step 260 may also comprise communicating such additional information to the communication device of the recipient.

Step 260 may, for example, comprise automatically attempting to deliver the recorded message from the cellular telephone to the communication device of the recipient over a plurality of available (or potentially available) communication paths. For example and without limitation, step 260 may comprise attempting to deliver the recorded message from the cellular telephone to the communication device of the recipient over traditional cellular communication pathways, computer communication pathways (e.g., Internet, LAN, WAN, MAN, PAN, etc.), television communication pathways, hardwired telephone communication pathways, satellite communication pathways, or any combination thereof.

In a non-limiting exemplary scenario where the recipient's communication device comprises cellular telephone characteristics, step 260 may comprise first attempting to utilize a traditional cellular communication path to communicate between the cellular telephone and the communication device of the recipient. If unsuccessful, then step 260 may comprise next attempting to utilize the Internet to communicate between the cellular telephone and the communication device of the recipient (e.g., utilizing a mapping of recipient telephone number to Internet message routing information). Continuing the non-limiting exemplary scenario, step 260 may comprise utilizing a traditional cellular telephone pathway for a first portion of a communication link between the cellular telephone and the recipient's communication device, utilizing an Internet communication pathway for a second portion of the communication link, and utilizing a wireless link (e.g., based on the IEEE 802.11 or 802.15 communication standards) between a home or office Internet access point and the communication device of the recipient.

In general, step 260 may comprise automatically attempting to deliver the recorded message from the cellular telephone to the communication device of the recipient. Accordingly, the scope of various aspects of the present invention should not be limited by characteristics of a particular manner of attempting to deliver a recorded message from a cellular telephone to another communication device.

The exemplary method 200 may, at step 265, comprise controlling execution flow of the method 200 based, at least in part, on whether step 260 successfully delivered the recorded message from the sender's cellular telephone to the communication device of the recipient. For example, at step 265, if it is determined that the recorded message was successfully delivered to the communication device of the recipient, then execution flow of the exemplary method 200 may flow to step 280 (e.g., for optional sender notification) or to step 290 for continued processing, non-limiting examples of which will be discussed later. Otherwise, if it has been determined that the recorded message was not successfully delivered to the communication device of the recipient, then execution flow of the exemplary method 200 may flow to step 270, which will be discussed below.

As mentioned previously, step 255 may comprise persistently attempting to deliver the recorded message to the communication device of the recipient. Also as mentioned previously, there may be various timing relationships between attempts to deliver the recorded message. As a non-limiting example, the method 200 may, at step 270, comprise waiting a period of time before a next attempt to deliver the recorded message to the communication device of the recipient. Step 270 may, for example, comprise waiting a predetermined static period, a period specified by a user of the cellular telephone (e.g., the sender), a dynamic period that is a function of various communication conditions, etc. Step 270 may also, for example, comprise waiting a period of time that is a function of message priority, time of the day, day of the week, power availability, signal strength, etc. In general, step 270 may comprise waiting any of a variety of periods of time (or no period of time), depending on the particular communication scenario.

After waiting a period of time at exemplary step 270, execution of the exemplary method 200 may flow back up to step 260, which as discussed above, may generally comprise automatically attempting to deliver the recorded message from the cellular telephone to the communication device of the recipient. Such looping back of execution flow completes the exemplary persistent delivery step 255, which may be performed in various communication scenarios.

As mentioned previously, at flow control step 265, if step 260 successfully delivered the recorded message to the recipient's communication device, execution flow of the exemplary method 200 may flow to step 280 for sender notification. Note that step 280 is presented for illustrative purposes and may be included or omitted depending on the particular operational scenario.

Step 280 may, for example following successful delivery of the recorded message from the cellular telephone to the recipient's communication device, comprise notifying the sender that the recorded message was successfully delivered. In an alternative exemplary scenario, the method 200 may comprise notifying the sender when a communication link has been established between the cellular telephone and the communication device of the recipient.

Step 280 may, for example, comprise providing a notification to the sender in any of a variety of manners. For example and without limitation, step 280 may comprise providing an audible or vibratory signal to notify the sender. Further for example, step 280 may comprise providing a visible signal to the sender (e.g., a flashing indication or a text message). In a non-limiting exemplary scenario, the method 200 may comprise ringing the sender's cellular telephone and the recipient's communication device simultaneously when a communication link between the devices has been established.

In general, step 280 may, in various scenarios, comprise notifying the sender of delivery of the recorded message to the communication device of the recipient. In other exemplary scenarios, the method 200 may comprise notifying the sender of establishment of a communication link between the cellular telephone and the communication device of the recipient. Step 280 (or another step of the method 200) may comprise generating such a notification in any of a variety of manners. Accordingly, the scope of various aspects of the present invention should not be limited by characteristics of any particular sender notification or any particular conditions that may cause the cellular telephone to generate such a notification.

The exemplary method 200 may, at step 290, comprise performing continued (or additional) processing. Step 290 may comprise performing any of a large variety of continued processing. For example and without limitation, step 290 may comprise monitoring handling of the recorded message by the recipient and/or the recipient's communication device. Step 290 may, in such an exemplary scenario, comprise notifying the sender of the status of the recorded message. For example, step 290 may comprise notifying the sender when the delivered message has been accessed by the recipient.

Step 290 may also, for example, comprise managing aspects of message receipt and notification at the recipient's communication device. For example and without limitation, step 290 may comprise notifying the recipient that the recorded message has arrived (e.g., in any of a variety of manners). For example, step 290 may comprise mimicking the real-time receipt of a telephone call or a text message at the recipient's communication device. Step 290 may, for example, comprise performing such mimicking independent of the communication pathway over which the recorded message was communicated. For example and without limitation, step 290 may comprise notifying the recipient in a manner similar to an arriving cellular telephone call, even in an exemplary scenario where the recorded message was communicated primarily over the Internet and a LAN.

Step 290 may also, for example, comprise providing the recipient the capability to control various aspects of message receiving and handling. For example, step 290 may comprise (e.g., prior to receiving a recorded message at the recipient's communication device or after receiving such a message) providing the recipient the capability to specify how the communication device of the recipient should handle the received message. For example, step 290 may comprise providing the recipient the ability to control whether or how the recipient's communication device is to notify the recipient of arriving messages. For example and without limitation, such handling may be based on message priority (or urgency), message type, time of day, day of the week, sender identification, available power resources, etc.

Also for example, step 290 may comprise providing the recipient the capability to control where or how an incoming message is to be stored in memory of the recipient's communication device or other assigned memory. Such storage may, for example, be a function of message priority, message type, time of day, day of the week, sender identification, available power resources, etc.

Additionally for example, step 290 may comprise providing the recipient the capability to control flow of message data from the cellular telephone to the recipient's communication device. For example, step 290 may comprise providing the recipient the capability to control the transfer of data from the cellular telephone to the recipient's communication device as though the cellular telephone is a remote answering machine or message server for the recipient's communication device.

Further for example, step 290 may comprise providing the recipient the capability to immediately call back the sender when the message arrives at the recipient's communication device. In a non-limiting exemplary scenario, step 290 may comprise automatically (e.g., without human interaction on the part of the recipient) calling back the sender's cellular telephone.

The previous examples are non-limiting and by no means representative of all types of continued processing that step 290 may comprise performing. Accordingly, the scope of various aspects of the present invention should not be limited by characteristics of any particular continued processing that step 290 may comprise performing.

The previous discussion, referring to FIG. 2, provides a non-limiting exemplary illustration of various aspects of the present invention. The scope of various aspects of the present invention should not be limited by the particular exemplary characteristics discussed. For example and without limitation, the previous discussion of the method 200 was generally directed to the sender utilizing a cellular telephone. Various aspects of the exemplary method 200 may also be applied in a scenario where the sender is utilizing a portable email device, computer, paging device, etc., rather than a cellular telephone. Accordingly, the scope of various aspects of the present invention should not be limited by characteristics of the particular cellular telephone example.

Figure 3:
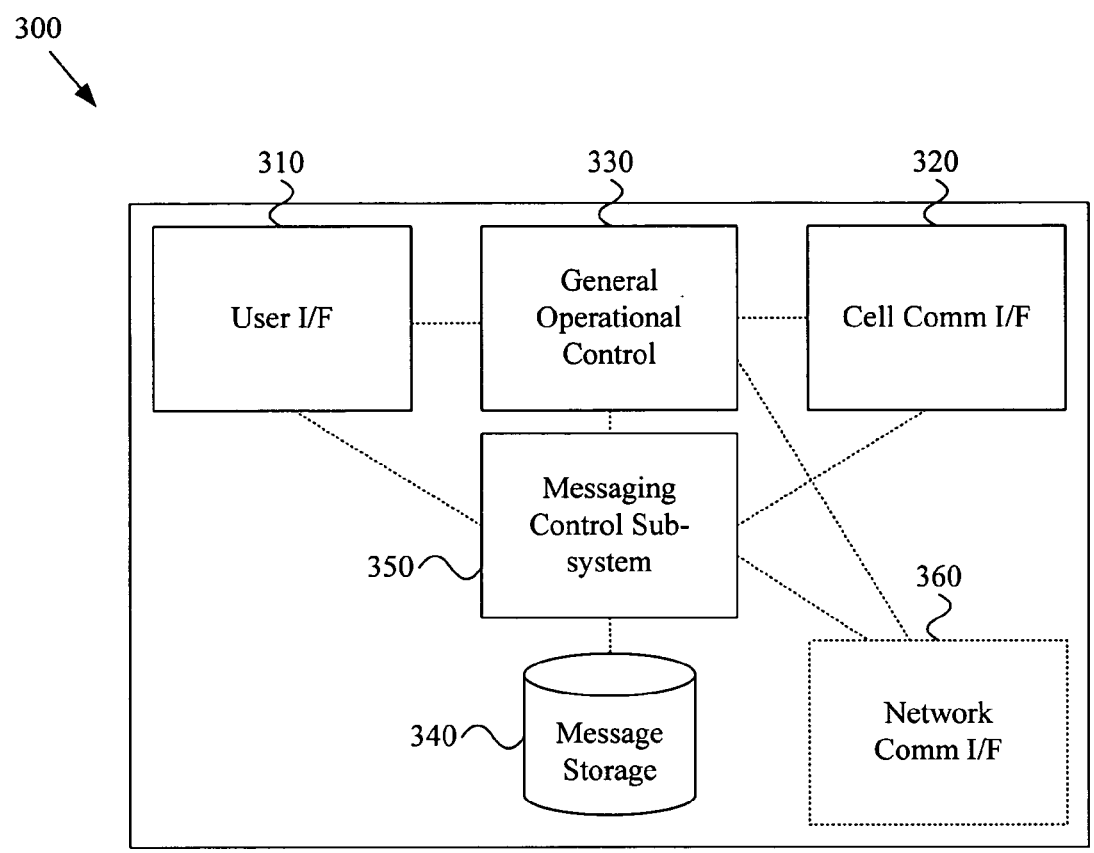
FIG. 3 is a block diagram illustrating a portion of an exemplary cellular telephone.

FIG. 3 is a block diagram illustrating portions of an exemplary cellular telephone 300. The exemplary cellular telephone 300 may, for example and without limitation, share various functional characteristics with the exemplary method 200 illustrated in FIG. 2 and discussed previously.

The exemplary cellular telephone 300 may comprise a user interface module 310, a cellular communication interface module 320, a general operational control module 330, message storage memory 340, a messaging control sub-system 350 (or module) and a network communication interface 360, each of which will be discussed in more detail below.

The user interface module 310 may, for example, provide an interface between the cellular telephone 300 and a user of the cellular telephone 300. For example, the user interface module 310 may provide audio, video and vibratory output signals to the user (e.g., utilizing a speaker, a video display and a vibration module). Also for example, the user interface module 310 may receive tactile, audio and/or video input signals from the user (e.g., utilizing a keypad or touch screen, a microphone, and a still or motion picture camera). The scope of various aspects of the present invention should not be limited by characteristics of any particular type of user interface.

The cellular communication interface module 320 may, for example, provide the cellular telephone 300 the capability to interface with a cellular communication network. For example, the cellular communication interface module 320 may perform signal processing, reception, transmission, and protocol management generally associated with cellular telephony. The cellular communication interface module 320 may, for example and without limitation, perform communications with one or more cellular networks in accordance with known or future cellular communication protocols and standards (e.g., GSM, CDMA, TDMA, MIMO, etc.).

The general operational control module 330 may, for example, generally control or manage operation of the cellular telephone 300. For example, in an exemplary scenario, the general operational control module 330 may utilize the user interface module 310 and the cellular communication interface module 320 to perform cellular communications between the user and the cellular communication network.

The message storage memory 340 may generally store recorded message information. The message storage memory 340 may be a dedicated memory or may be shared between various processes and/or modules of the cellular telephone 300. The message storage memory 340 may comprise characteristics of any of a wide variety of memory devices. For example and without limitation, the message storage memory 340 may comprise characteristics of memory chips, modules, cards, sticks, hard drives, or any of a variety of known or to-be-developed types of memory. The scope of various aspects of the present invention should not be limited by characteristics of a particular memory device or implementation.

The messaging control sub-system 350 may generally control various aspects of message communication from (and to) the cellular telephone 300. For example and without limitation, as will be exemplified in the discussion below, the messaging control sub-system 350 may perform various functional aspects discussed previously with regard to the exemplary method 200 illustrated in FIG. 2. The messaging control sub-system 350 may, for example, work in conjunction with other modules or components of the cellular telephone 300 to perform message management and communication in accordance with various aspects of the present invention.

The network communication interface module 360 may be optionally included to provide one or more communication links between the cellular telephone 300 and communication networks other than the cellular communication networks with which the cellular communication interface module 320 may communicate. For example and without limitation, referring to FIG. 1, the network communication interface module 360 may provide one or more communication links with any one or more of the illustrated communication networks. Such a communication link may, for example, be a wireless link, wired link, tethered optical link, non-tethered optical link, etc. As a non-limiting example, the network communication interface module 360 may be capable of providing a communication link between the cellular telephone 300 and a computer network (e.g., the Internet, a LAN, PAN, WAN, MAN, etc.).

The network communication interface module 360 may, for example, comprise a plurality of communication ports, which are capable of communicating over a plurality of respective communication media, networks, protocols, etc. The network communication interface module 360 may also, in some exemplary scenarios, determine which network to communicate over based on the content of the information being communicated (e.g., text, audio, video, general data, etc.).

Various operational aspects of the exemplary cellular telephone 300 will now be presented in the context of a non-limiting exemplary operating scenario. It should be recognized that the following scenario is illustrative and should not limit the scope of various aspects of the present invention.

In a non-limiting exemplary scenario, a user of the cellular telephone 300 (e.g., the sender) may attempt to utilize the cellular telephone 300 to communicate with a communication device of a recipient. For example, the sender may attempt to initiate a telephone call with the recipient or other type of communication. The sender may, for example, interface with the user interface module 310 of the cellular telephone 300 in attempting to perform the desired communication.

The communication device of the recipient may comprise characteristics of any of a variety of communication devices. For example and without limitation, the communication device of the recipient may comprise characteristics of a cellular telephone. Also for example, the communication device of the recipient may comprise characteristics of a pager, computer (e.g., pocket computer, notebook computer, laptop computer, desktop computer, etc.), personal email device, etc. Further for example, the communication device of the recipient may comprise characteristics of a portable or non-portable communication device. Additionally for example, the communication device of the recipient may comprise characteristics of a hard-wired communication device, RF communication device, optical communication device, etc. The scope of various aspects of the present invention should not be limited by characteristics of any particular type of communication device.

In response to the sender's attempt to communicate with the communication device of the recipient, the general operational control module 330 may utilize the cellular communication interface module 320 to attempt to establish a communication link between the cellular telephone 300 and the communication device of the recipient. Depending on the configuration of the cellular telephone 300, the general operational control module 330 may also utilize the network communication interface module 360 to establish a communication link between the cellular telephone 300 and the recipient's communication device through one or more alternative communication networks (e.g., computer communication networks).

Continuing the exemplary scenario, the general operational control module 330 may determine whether a communication link between the cellular telephone 300 and the communication device of the recipient is presently available (or may presently be established). For example and without limitation, the general operational control module 330 may share various functional characteristics with step 220 of the exemplary method 200 illustrated in FIG. 2 and discussed previously. The general operational control module 330 may determine whether a communication link between the cellular telephone 300 and the recipient's communication device may be established in any of a variety of manners.

For example and without limitation, the general operational control module 330 may utilize the cellular communication interface module 320 or the network communication interface module 360 to attempt to establish an end-to-end communication link between the cellular telephone 300 and the communication device of the recipient. Also for example, the general operational control module 330 may utilize either of the interface modules 320, 360 to communicate with a database (or a plurality of databases) that comprises information of whether the communication device of the recipient is presently active and/or communicatively coupled to an active and available communication network. For example, the general operational control module 330 may determine whether the communication device of the recipient is currently registered as active with a cellular network. In another example, the general operational control module 330 may determine whether the communication device of the recipient is currently registered as active with a computer network (e.g., the Internet, a company LAN, etc.). The scope of various aspects of the present invention should not be limited by characteristics of any particular manner of (or mechanism for) determining whether a communication link may be established between the cellular telephone 300 and the communication device of the recipient.

The general operational control module 330 may, for example, determine whether a communication link may be established between the cellular telephone 300 and the communication device of the recipient over any of a variety of communication pathways that may potentially exist between the cellular telephone 300 and the communication device of the recipient. For example and without limitation, as may be seen in FIG. 1, many potential communication pathways may exist between communication devices. The general operational control module 330 may determine whether a communication link may be established over any of such potential pathways.

For example, the general operational control module 330 may utilize the cellular communication interface module 320 to determine whether a communication link may be established between the cellular telephone 300 and the communication device of the recipient over a typical cellular telephone communication link. Also for example, the general operational control module 330 may utilize the network communication interface module 360 to determine whether a communication link may be established between the cellular telephone 300 and the communication device of the recipient over a computer communication network (e.g., the Internet, a LAN, WAN, PAN, MAN, or any combination thereof). The general operational control module 330 may also, for example, determine whether a communication link may be established between the cellular telephone 300 and the communication device of the recipient over a terrestrial hard-wired telephone system, over a cable television network or over a satellite communication network.

In an example where the general operational control module 330 determines whether a communication link may be established over a plurality of potential communication pathways, the general operational control module 330 may traverse a list of potential communication pathways (e.g., stored in on-board memory or a database communicatively coupled to the cellular telephone 300) until a communication link is established or until a determination is made that a communication link may not be established. Also for example, the general operational control module 330 may traverse an entire list of potential communication pathways to determine over which, if any, of the potential communication pathways a communication link may be established.

In general, the general operational control module 330 may determine whether a communication link between the cellular telephone 300 and a communication device of the recipient is available (or may presently be established). Accordingly, the scope of various aspects of the present invention should not be limited by characteristics of any particular manner of (or mechanism for) making such a determination.

Continuing the exemplary scenario, if the general operational control module 330 determines that a communication link between the cellular telephone 300 and the recipient's communication device is presently available, then the general operational control module 330 may utilize a communication interface module (e.g., the cellular communication interface module 320 or the network communication interface module 360) to establish the communication link (e.g., if such a communication link has not already been established). The general operational control module 330 may, for example and without limitation, share various functional characteristics with step 230 of the exemplary method 200 illustrated in FIG. 2 and discussed previously.

As mentioned previously, the communication link may comprise characteristics of any of a large variety of communication paths, including relatively complex paths traversing multiple communication networks. For example, the general operational control module 330 (e.g., in conjunction with the cellular communication interface module 320 or the network communication interface module 360) may utilize any one or more of a variety of communication media and/or communication protocols to establish the communication link. After establishment of the communication link, the sender may utilize the cellular telephone 300 to communicate directly with the recipient's communication device.

Otherwise, if the general operational control module 330 determines that a communication link between the cellular telephone 300 and the recipient's communication device is not presently available, then the general operational control module 330 may pass operation of the cellular telephone 300 (or a portion thereof) to the messaging control sub-system 350.

Continuing the exemplary scenario, the messaging control sub-system 350 may utilize the user interface module 310 to provide the sender with an option to record a message on the cellular telephone 300 (e.g., in the message storage memory 340) for later automatic delivery to the communication device of the recipient (e.g., when a communication link between the sender's cellular telephone and the recipient's communication device becomes available). For example and without limitation, the messaging control sub-system 350 may share various functional characteristics with step 240 of the exemplary method 200 illustrated in FIG. 2 and discussed previously.

The messaging control sub-system 350 may offer the sender the option to record a message on the cellular telephone 300 for later delivery in any of a variety of manners. For example, the messaging control sub-system 350 may utilize the user interface module 310 to generate audible or visible indicia to notify the sender of the option. The messaging control sub-system 350 may also, for example, utilize the user interface module 310 to receive input from the sender regarding the messaging option.

Note that in various alternative exemplary scenarios, the sender may initiate operation of the messaging control sub-system 350 directly, rather than first utilizing the general operational control module 330 to determine whether a communication link between the cellular telephone 300 and the recipient's communication device is presently available. For example and without limitation, the user interface module 310 may provide a mechanism that allows the sender to initiate the recording option directly. Accordingly, the scope of various aspects of the present invention should not be limited by characteristics of any particular manner of (or mechanism for) initiating operation of the messaging control sub-system 350 or other modules of the cellular telephone 300.

Continuing the exemplary scenario, if the messaging control sub-system 350 determines that the sender does not desire to record a message on the cellular telephone 300 for later automatic delivery, then the messaging control sub-system 350 may pass control of the cellular telephone operation, or a portion thereof, back to the general operational control module 330 for continued operation. Otherwise, if the messaging control sub-system 350 determines that the sender desires to record a message on the cellular telephone 300 for later automatic delivery, then operation of the messaging control sub-system 350 may continue, as explained below.

Continuing the exemplary scenario in the context of the sender expressing the desire to record a message on the cellular telephone 300 for later delivery, the messaging control sub-system 350 may then record a message from the sender on the cellular telephone 300 for later automatic delivery (e.g., persistent automatic delivery) to the communication device of the recipient. The messaging control sub-system 350 may, for example and without limitation, share various functional characteristics with step 250 of the exemplary method 200 illustrated in FIG. 2 and discussed previously. The messaging control sub-system 350 may, for example, utilize the user interface module 310 to obtain the message from the sender, and utilize the message storage memory 340 to store the message obtained from the sender.

The message may comprise characteristics of any of a variety of message types. For example and without limitation, the message may comprise characteristics of an audio message or a video message. Also for example, the message may comprise characteristics of pictorial, textual or graphical message information. In various exemplary scenarios, the message may comprise additional information (e.g., callback information, time information, priority or urgency information, message handling control information, etc.).

Note that in various operational examples, the messaging control sub-system 350 may provide the sender the capability to select between pre-recorded messages. As a non-limiting example, such a message may comprise characteristics of a generic "call me ASAP" message. In such operational examples, the messaging control sub-system 350 may utilize the user interface module 310 to obtain message selection information from the sender.

Generally, the messaging control sub-system 350 may record a message from the sender on the cellular telephone 300 for later automatic delivery to the communication device of the recipient. Accordingly, the scope of various aspects of the present invention should not be limited by characteristics of any particular message type, mechanism for obtaining or recording a message, or the timing of such a message recording.

Continuing the non-limiting exemplary scenario, the messaging control sub-system 350 may provide to the sender the capability to specify various aspects of the manner in which the recorded message is communicated to (or handled by) the communication device of the recipient. For example and without limitation, the messaging control sub-system 350 may share various functional characteristics with step 252 of the exemplary method 200 illustrated in FIG. 2 and discussed previously. Such aspects may comprise, without limitation, timing characteristics for attempted delivery of the recorded message to the communication device of the recipient (e.g., continually retry, retry every n minutes, retry every half hour, try at particular times, etc.). Such aspects may also, for example, comprise selecting a communication path or group of communication paths over which the message may be delivered to the communication device of the recipient (e.g., specify a list or ordered list of known potential communication paths).

The messaging control sub-system 350 may, for example, provide the sender the capability to specify how the sender desires the communication device of the recipient to handle the message once the message is delivered. For example, the sender may specify that the sender desires the communication device of the recipient to present the message to the recipient in a manner similar to an incoming telephone call. Also for example, the sender may specify that the sender desires the communication device of the recipient to present the message to the recipient in a manner similar to an incoming text message. As will be discussed later, the recipient may also be provided capability to specify how the recipient's communication device handles incoming messages (e.g., storage in on-board or off-board voice mail storage, type of notification for message arrival, message data flow control, etc.).

In one example, the messaging control sub-system 350 may (e.g., utilizing the cellular communication interface module 320 or network communication interface module 360) determine message communicating and/or handling capabilities of the recipient's communication device. The messaging control sub-system 350 may then, for example, utilize the user interface module 310 to present such information to the sender to utilize in making communication and notification decisions. Also for example, the messaging control sub-system 350 may utilize the determined capabilities to select which communication control options are presented to the sender.

In general, the messaging control sub-system 350 may provide to the sender the capability to specify various aspects of the manner in which the recorded message is communicated to (or handled by) the communication device of the recipient. Accordingly, the scope of various aspects of the present invention should not be limited by characteristics of any particular manner of communicating or handling a message or by characteristics of any particular manner of (or mechanism for) providing the sender the capability to specify various aspects of message communicating or handling.

Continuing the non-limiting exemplary scenario, after recording the message on the cellular telephone 300 (e.g., in the message storage memory 340), the messaging control sub-system 350 may automatically deliver the recorded message from the cellular telephone 300 to the communication device of the recipient. The messaging control sub-system 350 may, for example and without limitation, share various functional characteristics with step 255 of the exemplary method 200 illustrated in FIG. 2 and discussed previously.

The messaging control sub-system 350 may, for example, persistently attempt to deliver the recorded message to the communication device of the recipient. The messaging control sub-system 350 may perform such persistent delivery in any of a variety of manners, one example of which is provided in the exemplary method 200 illustrated in FIG. 2. The scope of various aspects of the present invention should not be limited by characteristics of any particular manner of performing persistent message delivery.

The messaging control sub-system 350 may, for example, automatically (e.g., without additional human interaction with the sender) attempt to deliver the recorded message from the cellular telephone 300 to the communication device of the recipient. For example, the messaging control sub-system 350 may attempt to deliver the recorded message over at least one of the communication links that the general operational control module 330 previously determined is available for communication between the cellular telephone 300 and the communication device of the recipient. For example, the messaging control sub-system 350 may comprise utilizing at least one of the cellular communication interface module 330 or the network communication interface module 360 to communicate the recorded message to the recipient's communication device.

The messaging control sub-system 350 may, for example, automatically attempt to deliver the recorded message from the cellular telephone 300 to the communication device of the recipient or, for example, a message server associated with the communication device of the recipient. The messaging control sub-system 350 may also, for example, automatically attempt to deliver the recorded message from the cellular telephone 300 to a communication device of a second recipient. Further for example, the messaging control sub-system 350 may automatically attempt to deliver the recorded message from the cellular telephone 300 to a defined group of recipients and/or associated respective communication devices.

As mentioned previously, a recorded message may comprise a variety of additional information (e.g., including but not limited to sender callback information). The messaging control sub-system 350 may also communicate such additional information to the communication device of the recipient.

The messaging control sub-system 350 may, for example, automatically attempt to deliver the recorded message from the cellular telephone 300 to the communication device of the recipient over a plurality of available (or potentially available) communication paths. For example and without limitation, the messaging control sub-system 350 may attempt to deliver the recorded message from the cellular telephone 300 to the communication device of the recipient over traditional cellular communication pathways (e.g., utilizing the cellular communication interface module 320). Also for example, the messaging control sub-system 350 may attempt to deliver the recorded message from the cellular telephone 300 over other communication paths (e.g., utilizing the network communication interface module 360), such as, for example, computer communication pathways (e.g., Internet, LAN, WAN, MAN, PAN, etc.), television communication pathways, hard-wired telephone communication pathways, satellite communication pathways, or any combination thereof.

In the non-limiting exemplary scenario, the recipient's communication device may comprise cellular telephone characteristics. The messaging control sub-system 350 may first attempt to utilize a traditional cellular communication path to communicate between the cellular telephone 300 and the communication device of the recipient. If unsuccessful, then the messaging control sub-system 350 may next attempt to utilize the Internet to communicate between the cellular telephone 300 and the communication device of the recipient (e.g., utilizing a mapping of recipient telephone number to Internet message routing information). Continuing the non-limiting exemplary scenario, the messaging control sub-system 350 may also utilize a traditional cellular telephone pathway for a first portion of a communication link between the cellular telephone 300 and the recipient's communication device, utilize an Internet communication pathway for a second portion of the communication link, and utilize a wireless link (e.g., based on the IEEE 802.11 or 802.15 communication standards) between a home or office Internet access point and the communication device of the recipient.

In general, the messaging control sub-system 350 may automatically attempt to deliver the recorded message from the cellular telephone 300 to the communication device of the recipient. Accordingly, the scope of various aspects of the present invention should not be limited by characteristics of a particular manner of (or mechanism for) attempting to deliver a recorded message from a cellular telephone to another communication device.

If the messaging control sub-system 350 determines that the recorded message was successfully delivered to the communication device of the recipient, then the messaging control sub-system 350 may return operation of the cellular telephone 300 (or a portion thereof) to the general operational control module 330. Otherwise, if the messaging control sub-system 350 determines that the recorded message was not successfully delivered to the communication device of the recipient, then the messaging control sub-system 350 may continue to attempt to deliver the recorded message.

As mentioned previously, the messaging control sub-system 350 may persistently attempt to deliver the recorded message to the communication device of the recipient. Also as mentioned previously, there may be various timing relationships between attempts to deliver the recorded message. As a non-limiting example, the messaging control sub-system 350 may wait a period of time before a next attempt to deliver the recorded message to the communication device of the recipient. The messaging control sub-system 350 may, for example, wait a predetermined static period, a period specified by a user of the cellular telephone 300 (e.g., the sender), a dynamic period that is a function of various communication conditions, etc. The messaging control sub-system 350 may also, for example, wait a period of time that is a function of message priority, time of the day, day of the week, power availability, signal strength, etc. In general, the messaging control sub-system 350 may wait any of a variety of periods of time (or no period of time), depending on the particular communication scenario. After (optionally) waiting a period of time the messaging control sub-system 350 may again attempt to deliver the recorded message from the cellular telephone 300 to the communication device of the recipient.

As mentioned previously, if the messaging control sub-system 350 successfully delivers the recorded message to the recipient's communication device, the messaging control sub-system 350 may pass control of the cellular telephone 300 operation back to the general operational control module 330. Also for example, the messaging control sub-system 350 may utilize the user interface module 310 to notify the sender of the message delivery. For example and without limitation, the messaging control sub-system 350 may share various functional characteristics with step 280 of the exemplary method 200 illustrated in FIG. 2 and discussed previously.

For example, the messaging control sub-system 350 may, for example following successful delivery of the recorded message from the cellular telephone 300 to the recipient's communication device, notify the sender that the recorded message was successfully delivered. Also for example, the messaging control sub-system 350 may notify the sender when a communication link has been established between the cellular telephone 300 and the communication device of the recipient.

The messaging control sub-system 350 may (e.g., utilizing the user interface module 310) provide a notification to the sender in any of a variety of manners. For example and without limitation, the messaging control sub-system 350 may provide an audible or vibratory signal to notify the sender. Further for example, the messaging control sub-system 350 may provide a visible signal to the sender (e.g., a flashing indication or a text message). Additionally, for example, the messaging control sub-system 350 may notify (e.g., ring) the sender's cellular telephone and the recipient's communication device simultaneously when a communication link between the devices has been established.

In general, the messaging control sub-system 350 may, in any of a variety of manners, notify the sender of delivery of the recorded message to the communication device of the recipient. In other examples, the messaging control sub-system 350 may notify the sender of establishment of a communication link between the cellular telephone 300 and the communication device of the recipient. The messaging control sub-system 350 (e.g., utilizing the user interface module 310) may generate such a notification in any of a variety of manners. Accordingly, the scope of various aspects of the present invention should not be limited by characteristics of any particular sender notification or any particular conditions that may cause the messaging control sub-system 350 to generate such a notification.

The messaging control sub-system 350 may, for example, perform any of a variety of additional processing tasks. For example and without limitation, the messaging control sub-system 350, and/or other module(s) of the cellular telephone 300, may share various functional characteristics with step 290 of the exemplary method 200 illustrated in FIG. 2 and discussed previously. For example, the messaging control sub-system 350 may monitor handling of the recorded message by the recipient and/or the recipient's communication device. The messaging control sub-system 350 may, for example, utilize the user interface module 310 to notify the sender of the status of the recorded message. For example, the messaging control sub-system 350 may notify the sender when the delivered message has been accessed by the recipient.

The messaging control sub-system 350 may also, for example, manage aspects of message receipt and notification at the recipient's communication device. For example and without limitation, the messaging control sub-system 350 may cause the recipient's communication device to notify the recipient that the recorded message has arrived (e.g., in any of a variety of manners). For example, the messaging control sub-system 350 may cause the communication device of the recipient to mimic a real-time receipt of a telephone call or a text message. The messaging control sub-system 350 may, for example, cause the recipient's communication device to mimic a received telephone call independent of the communication pathway over which the recorded message was communicated. For example and without limitation, the messaging control sub-system 350 may cause the recipient's communication device to notify the recipient in a manner similar to an arriving cellular telephone call, even in an exemplary scenario where the recorded message was communicated primarily over the Internet and a LAN.

The messaging control sub-system 350 may also, for example, provide the recipient the capability to control various aspects of message receiving and handling at the recipient's communication device. For example, the messaging control sub-system 350 may provide the recipient the capability to specify how the communication device of the recipient should handle the received message. For example, the messaging control sub-system 350 may provide the recipient the capability to control delivery and/or presentation of the recorded message to the recipient. For example and without limitation, the messaging control sub-system 350 may provide the recipient the capability to control the rate at which message data is communicated from the cellular telephone 300 to the recipient's communication device. This functionality may be of value, for example, in a situation where the recipient's communication device does not have enough memory to receive the message in its entirety.

Further for example, the messaging control sub-system 350 may provide the recipient the capability to immediately call back the sender (e.g., over a communication link that has already been established) when the message arrives at the recipient's communication device. The previous examples are non-limiting and by no means representative of all types of continued processing that the messaging control sub-system 350 may perform. Accordingly, the scope of various aspects of the present invention should not be limited by characteristics of any particular continued processing that the messaging control sub-system 350 may perform.

Figure 4:
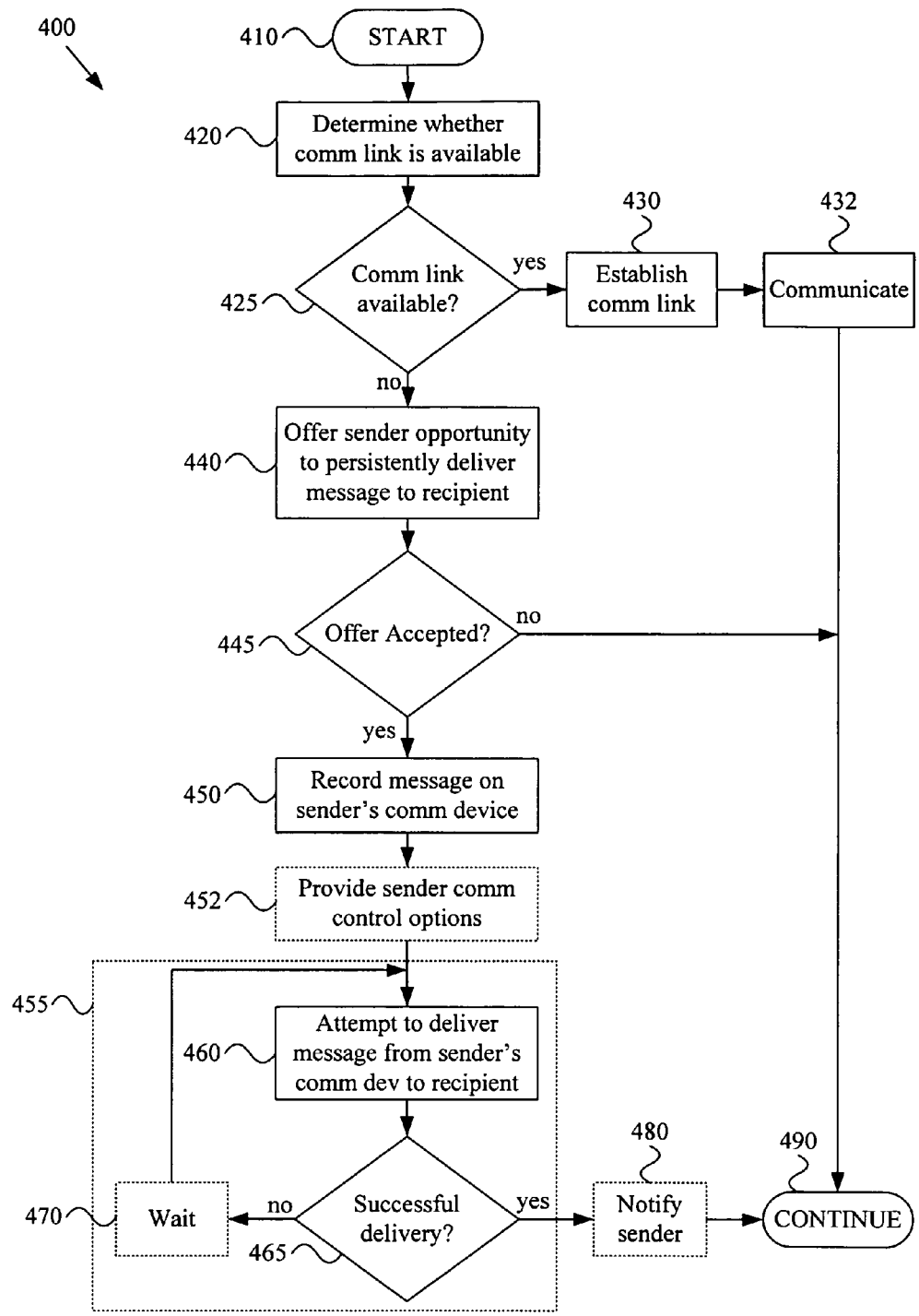
FIG. 4 is a flow diagram illustrating an exemplary method for communicating an electronic message to a recipient.

FIG. 4 is a flow diagram illustrating an exemplary method 400 for communicating an electronic message to a recipient. As mentioned previously in the discussion of the exemplary method 200 illustrated in FIG. 2, the scope of various aspects of the present invention should not be limited by characteristics of the cellular telephone example discussed with regard to that exemplary method 200.

The steps of the exemplary method 400 are generally analogous to similarly numbered steps of the exemplary method 200 of FIG. 2, albeit with regard to a general communication device for the sender, rather than a cellular telephone device. As an example, the exemplary method 400, at step 420, may comprise determining the availability of a general communication link between the sender's general communication device and the recipient's communication device, where step 220 may comprise determining the availability of a cellular communication link. As another example, the method 400, at step 450, may comprise recording the message on the sender's general communication device, where step 250 may generally comprise recording the message on the sender's cellular telephone.

As illustrated in the exemplary method 400 illustrated in FIG. 4, the scope of various aspects of the present invention should not be limited by functional characteristics specifically associated with cellular telephony.

Figure 5:
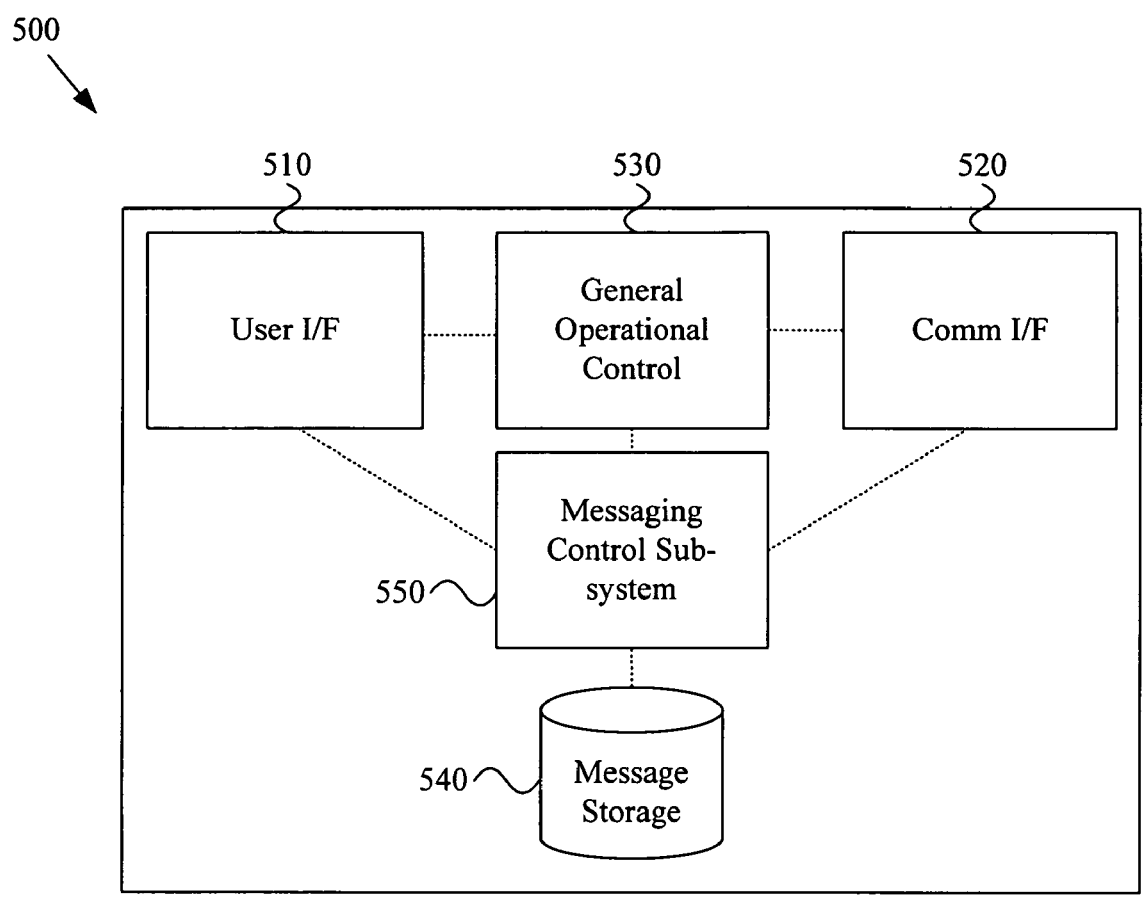
FIG. 5 is a block diagram illustrating a portion of an exemplary communication device.

FIG. 5 is a block diagram illustrating a portion of an exemplary communication device 500. As mentioned previously in the discussion of the exemplary cellular telephone 300 illustrated in FIG. 3, the scope of various aspects of the present invention should not be limited by characteristics of the particular cellular telephone example.

The components and modules of the exemplary communication device 500 are generally analogous to similarly numbered and similarly labeled modules of the exemplary cellular telephone 300 of FIG. 3, albeit with regard to a general communication device, rather than a cellular telephone device. As an example, the communication interface module 520 is a general communication interface module, capable of establishing communication with any of a large variety of communication networks (e.g., over any of a variety of communication media and utilizing any of a variety of communication protocols), while the cellular communication interface module 320 was generally directed to communication over a cellular communication network.

As illustrated in the exemplary communication device 500 illustrated in FIG. 5, the scope of various aspects of the present invention should not be limited by characteristics specifically associated with a cellular telephone.

Figure 6:
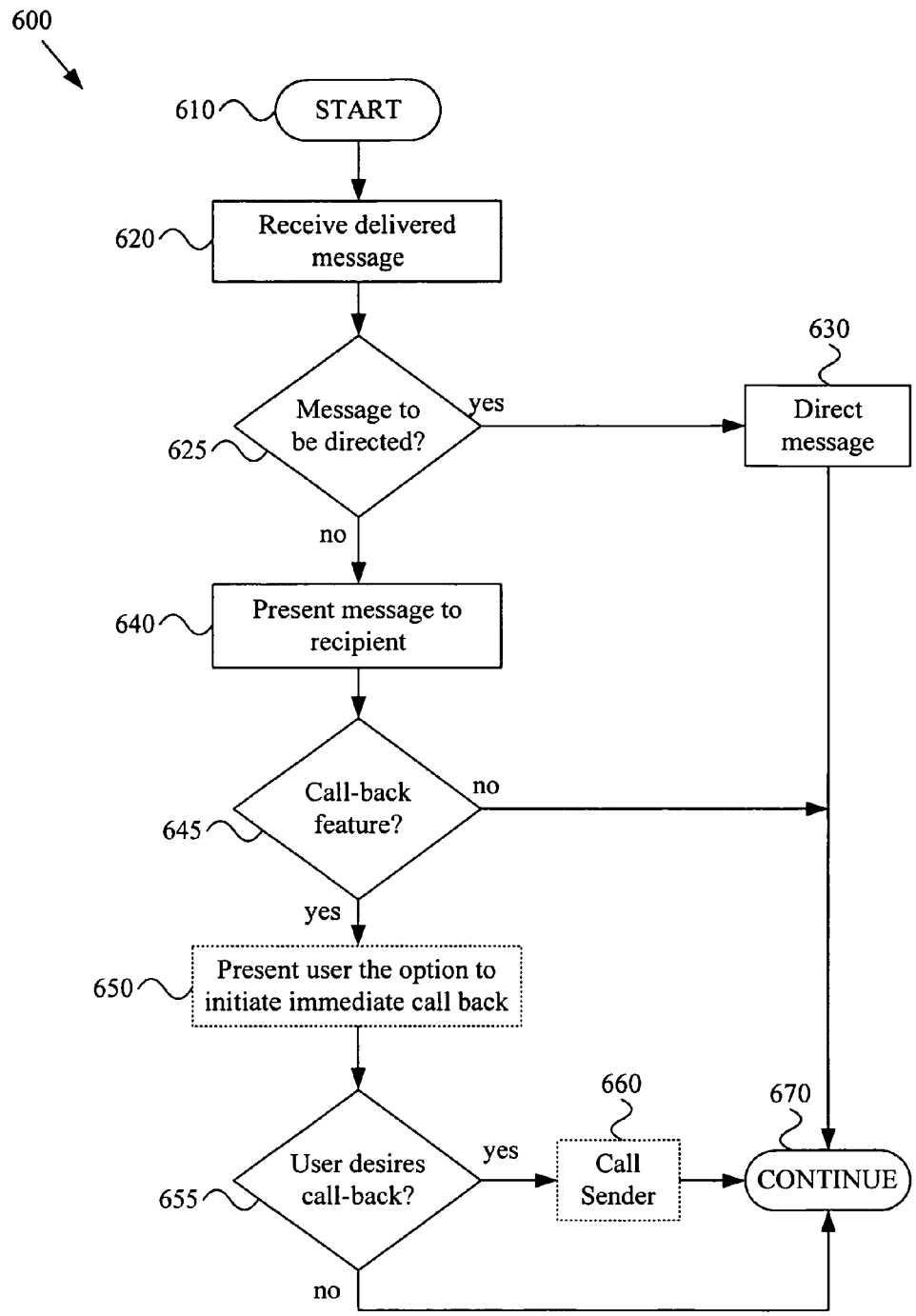
FIG. 6 is a flow diagram illustrating an exemplary method for receiving a recorded message.

As discussed previously, various aspects of the present invention may also concern the reception and handling of recorded messages at a recipient's communication device. FIG. 6 is a flow diagram illustrating an exemplary method 600 for receiving a recorded message (e.g., a general message or a cellular message). Such a message may, for example and without limitation, have been communicated to a recipient's communication device (e.g., a cellular telephone) in accordance with the methods 200, 400 illustrated in FIGS. 2 and 4 and discussed previously. Note that, as with the exemplary methods 200, 400 illustrated in FIGS. 2 and 4, the scope of various aspects of the present invention should not be limited by characteristics specifically associated with a cellular telephone message, cellular telephone, or cellular communication network.

The exemplary method 600 may begin execution at step 610. The method 600 may begin executing in response to any of a variety of causes or conditions. For example and without limitation, the method 600 may begin executing in response to completing communication of a delivered message (e.g., a message originally stored at a sender's communication device) to the recipient's communication device (e.g., cellular telephone). Also for example, the method 600 may begin executing in response to beginning receipt of a delivered message (e.g., a message originally stored at a sender's communication device) at the recipient's communication device. Further for example, the method 600 may begin executing in response to an explicit user command to begin. Accordingly, the scope of various aspects of the present invention should not be limited by characteristics of any particular initiating causes or conditions.

The exemplary method 600 may, at step 620, comprise receiving a delivered message (e.g., a message originally stored at a sender's communication device). In various exemplary scenarios, step 620 may comprise providing the recipient the ability to control the delivery of the message to the recipient's communication device (e.g., by throttling delivery of the message recorded on the sender's communication device to the recipient's communication device or controlling delivery of the message recorded on the sender's communication device in a manner commensurate with a remote answering machine or message server).

As discussed previously, the recipient of a message may be provided the capability to specify how a received message is handled by the recipient's communication device. The recipient may be provided such capability either before or after the message arrives. For example, the recipient may specify how a message is to be handled prior to receiving the message, and such specification may be stored in a message receipt profile. Also for example, the recipient may be asked how to handle a message after the message has arrived or as the message is arriving.

The exemplary method 600 may, at step 625, control execution flow of the method 600. For example, if it is determined that the message is to be directed (e.g., vectored) to memory or some other location (e.g., a mailbox), then execution of the method 600 will flow to step 630 to perform such message directing. If, however, it is determined that the message is not to be directed to memory or some other location, then execution of the method 600 may proceed to step 640 for presentation of the received message to the recipient.

The exemplary method 600 may, at step 640, comprise presenting the received message to the recipient. Step 640 may, for example, comprise presenting the received message to the recipient in a default manner, a manner specified by the sender of the received message, or a manner specified by the recipient. For example, in a non-limiting exemplary scenario, the recipient may have specified (e.g., prior to arrival of the message) that voice messages are to be presented like arriving telephone calls, and text messages are to be presented like arriving pages. Step 640 may then, for example, comprise presenting the delivered message according to the recipient's specifications.

As discussed previously, the recipient of a message may be provided the capability to call back the sender of the received message. For example, the recipient's communication device may provide the recipient the capability to initiate an immediate callback of the sender. Also for example, the recipient's communication device may automatically initiate a callback of the sender (e.g., in the absence of additional human interaction with the recipient).

The exemplary method 600 may, at step 645, comprise controlling execution flow of the method 600. For example, if it is determined that a callback feature is not enabled, then execution of the method 600 may flow to general continued processing at step 670. If, however, it is determined that a callback feature is enabled, then execution of the method 600 may flow to step 650 for presenting the recipient the option of calling back the sender. As mentioned previously, the exemplary method 600 may include a provision for an automatic callback, but the illustrated exemplary method 600 provides the recipient the option of initiating a sender callback.

The exemplary method 600 may, at step 655, control execution flow of the method 600. For example if it is determined that the recipient does not desire to initiate a sender callback, then execution of the method 600 may flow to general continued processing at step 670. If, however, it is determined that the recipient desires to initiate a sender callback, then execution of the method 600 may flow to step 660 to perform the sender callback.

The previous discussion presented various aspects of a cellular telephone and a general communication device in terms of functional modules. It should be noted that a module may be implemented in hardware, software or a combination thereof. It should also be noted that various modules may share components. As a non-limiting example, hardware modules may share various hardware components, and software modules may share various software routines or components. Accordingly, the scope of various aspects of the present invention should not be limited by characteristics of a particular module implementation or by arbitrary notions of boundaries (either hardware or software) between modules.

Also, the various aspects of the present invention may be implemented in a system that includes hardware and/or software in varying degrees of integration. For example, various aspects of the present invention may be implemented on distributed system components, while various aspects of the present invention may be implemented in a single device, single circuit board or single integrated circuit. Accordingly, the scope of various aspects of the present invention should not be limited by any particular degree of integration of a system implementing the present invention.

In summary, various aspects of the present invention provide a system and method for communicating an electronic message (e.g., a cellular telephone message) to a recipient. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a cellular telephone, a method for communicating a message, the method comprising:
   providing a sender with an option to record a message on the cellular telephone for later automatic delivery to a communication device of a recipient;

recording a message from the sender on the cellular telephone for later automatic delivery to the communication device of the recipient; and automatically delivering the recorded message from the cellular telephone to the communication device of the recipient, wherein said automatically delivering comprises repeatedly, and periodically at a dynamic adaptable period, attempting to utilize a plurality of alternative possible communication networks to deliver the recorded message to the communication device of the recipient.

2. The method of claim 1, further comprising:

prior to performing said option providing, said message recording and said automatic message delivering, determining whether a communication link between the cellular telephone and the communication device of the recipient may presently be established; and if it is determined that a communication link between the cellular telephone and the communication device of the recipient may not presently be established, then performing said option providing, said message recording and said automatic message delivering.

3. The method of claim 1, wherein the dynamic adaptable period is a function of power availability.

4. The method of claim 1, wherein the dynamic adaptable period is a function of signal strength.

5. The method of claim 1, wherein the dynamic adaptable period is a function of time of day.

6. The method of claim 1, wherein said automatically delivering the recorded message from the cellular telephone to the communication device of the recipient comprises persistently attempting to deliver the recorded message to a message server associated with the recipient.

7. The method of claim 1, wherein said automatically delivering the recorded message from the cellular telephone to the communication device of the recipient comprises communicating callback information to the communication device of the recipient.

8. The method of claim 1, wherein the plurality of alternative possible communication networks comprises a cellular communication network and a computer communication network.

9. The method of claim 8, wherein the computer communication network comprises the Internet.

10. The method of claim 1, further comprising providing to the sender the capability to specify a group of alternative possible communication networks through which the recorded message may be communicated to the communication device of the recipient.

11. The method of claim 1, further comprising providing to the sender the capability to specify characteristics of a plurality of communication paths over which the recorded message may be delivered to the communication device of the recipient.

12. The method of claim 1, further comprising, following successful delivery of the recorded message from the cellular telephone to the communication device of the recipient, notifying the sender that the recorded message was successfully delivered to the communication device of the recipient.

13. The method of claim 1, further comprising establishing a communication link between the cellular telephone and the communication device of the recipient over which the recorded message will be communicated to the communication device of the recipient, and following establishment of the communication link, notifying the sender of the establishment of the communication link.

14. The method of claim 1, further comprising, at the communication device of the recipient, providing the recipient with the capability to specify how the communication device of the recipient should handle recorded messages delivered to the communication device of the recipient.

15. The method of claim 1, wherein automatically delivering the recorded message from the cellular telephone to the communication device of the recipient comprises:

establishing a communication link between the cellular telephone and a wireless personal area network; and delivering the recorded message from the cellular telephone to the communication device of the recipient through the wireless personal area network.

16. The method of claim 1, wherein automatically delivering the recorded message from the cellular telephone to the communication device of the recipient comprises:

establishing a communication link between the cellular telephone and a wireless local area network; and delivering the recorded message from the cellular telephone to the communication device of the recipient through the wireless local area network.

17. In a cellular telephone, a method for communicating a message, the method comprising:

providing a sender with an option to record a message on the cellular telephone for later automatic delivery to a communication device of a recipient;

recording a message from the sender on the cellular telephone for later automatic delivery to the communication device of the recipient; and providing to the sender the capability to specify timing characteristics for periodic attempted delivery of the recorded message to the communication device of the recipient; and automatically delivering the recorded message from the cellular telephone to the communication device of the recipient, wherein said automatically delivering comprises repeatedly attempting to utilize a plurality of alternative possible communication networks to deliver the recorded message to the communication device of the recipient.

18. In a cellular telephone, a method for communicating a message, the method comprising:

providing a sender with an option to record a message on the cellular telephone for later automatic delivery to a communication device of a recipient;

recording a message from the sender on the cellular telephone for later automatic delivery to the communication device of the recipient;

providing to the sender the capability to specify the manner in which the communication device of the recipient presents the recorded message to the recipient upon receipt of the recorded message by the recipient; and automatically delivering the recorded message from the cellular telephone to the communication device of the recipient, wherein said automatically delivering comprises repeatedly attempting to utilize a plurality of alternative possible communication networks to deliver the recorded message to the communication device of the recipient.

19. In a cellular telephone having at least a user interface, a wireless communication interface and a memory, a subsystem comprising:

at least one module operable to, at least:

utilize the user interface to provide a sender with an option to record a message on the cellular telephone for later automatic delivery to a communication device of a recipient;

utilize the user interface and the memory to record a message from the sender on the cellular telephone for later automatic delivery to the communication device of the recipient; and utilize the wireless communication interface to automatically deliver the recorded message from the cellular telephone to the communication device of the recipient by, at least in part, operating to repeatedly, and periodically at a dynamic adaptable period, attempt to utilize a plurality of alternative possible communication networks to deliver the recorded message to the communication device of the recipient.

20. The cellular telephone of claim 19, wherein the at least one module is further operable to:

prior to performing said option providing, said message recording and said automatic message delivering, utilize the wireless communication interface to determine whether a communication link between the cellular telephone and the communication device of the recipient may presently be established; and if it is determined that a communication link between the cellular telephone and the communication device of the recipient may not presently be established, then perform said option providing, said message recording and said automatic message delivering.

21. The cellular telephone of claim 19, wherein the dynamic adaptable period is a function of power availability.

22. The cellular telephone of claim 19, wherein the dynamic adaptable period is a function of signal strength.

23. In a communication device, a method for communicating a message, the method comprising:

determining whether a communication link between the communication device and a communication device of a recipient may presently be established; and if it is determined that a communication link between the communication device and the communication device of the recipient may not presently be established, then:
  providing a sender with an option to record a message on the communication device for later automatic delivery to the communication device of the recipient;
  recording a message from the sender on the communication device for later automatic delivery to the communication device of the recipient; and
  automatically delivering the recorded message from the communication device to the communication device of the recipient, wherein said automatically delivering comprises repeatedly, and periodically at a dynamic adaptable period, attempting to utilize a plurality of alternative possible communication networks to deliver the recorded message to the communication device of the recipient.

24. The method of claim 23, wherein the communication device and/or the communication device of the recipient comprises a cellular telephone.

25. In a cellular telephone, a method for communicating a message, the method comprising:

providing a sender with an option to record a message on the cellular telephone for later automatic delivery to a communication device of a recipient;

recording a message from the sender on the cellular telephone for later automatic delivery to the communication device of the recipient; and automatically delivering the recorded message from the cellular telephone to the communication device of the recipient, wherein said automatically delivering comprises repeatedly, and periodically at a dynamic adaptable period:

first attempting to utilize a first communication network of a plurality of alternative possible communication networks to deliver the recorded message to the communication device of the recipient; and if said first attempting is unsuccessful, then second attempting to utilize a second communication network of the plurality of alternative possible communication networks to deliver the recorded message to the communication device of the recipient.

26. The method of claim 25, wherein:

said first attempting comprises attempting to utilize a telecommunication network to deliver the recorded message to the communication device of the recipient; and said second attempting comprises attempting to utilize the Internet to deliver the recorded message to the communication device of the recipient.

27. The method of claim 26, wherein said attempting to utilize the Internet to deliver the recorded message to the communication device of the recipient comprises utilizing a mapping of recipient telephone number to Internet message routing information.

28. In a cellular telephone having at least a user interface, a wireless communication interface and a memory, a subsystem comprising:

at least one module operable to, at least:

utilize the user interface to provide a sender with an option to record a message on the cellular telephone for later automatic delivery to a communication device of a recipient;

utilize the user interface and the memory to record a message from the sender on the cellular telephone for later automatic delivery to the communication device of the recipient; and utilize the wireless communication interface to automatically deliver the recorded message from the cellular telephone to the communication device of the recipient by, at least in part, operating to repeatedly, and periodically at a dynamic adaptable period:

first attempt to utilize a first communication network of a plurality of alternative possible communication networks to deliver the recorded message to the communication device of the recipient; and if said first attempt is unsuccessful, then second attempt to utilize a second communication network of the plurality of alternative possible communication networks to deliver the recorded message to the communication device of the recipient.

29. The subsystem of claim 28, wherein the first communication network comprises a telecommunication network and the second communication network comprises the Internet.

30. The subsystem of claim 29, wherein the at least one module operates to second attempt to utilize the Internet to deliver the recorded message to the communication device of the recipient by, at least in part, operating to utilize a mapping of recipient telephone number to Internet message routing information.

* * * * *